(12) United States Patent
Shin et al.

(10) Patent No.: US 11,367,235 B2
(45) Date of Patent: Jun. 21, 2022

(54) METHOD AND DEVICE FOR SIMPLIFYING THREE-DIMENSIONAL MESH DATA

(71) Applicant: SK TELECOM CO., LTD., Seoul (KR)

(72) Inventors: Seungho Shin, Seoul (KR); Gukchan Lim, Seoul (KR); Jinsoo Jeon, Seoul (KR); Ikhwan Cho, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/760,625

(22) PCT Filed: Oct. 31, 2018

(86) PCT No.: PCT/KR2018/013122
§ 371 (c)(1),
(2) Date: Apr. 30, 2020

(87) PCT Pub. No.: WO2019/088705
PCT Pub. Date: May 9, 2019

(65) Prior Publication Data
US 2021/0183125 A1    Jun. 17, 2021

(30) Foreign Application Priority Data
Oct. 31, 2017  (KR) .................. 10-2017-0143516

(51) Int. Cl.
*G06T 13/20* (2011.01)
*G06T 17/20* (2006.01)

(52) U.S. Cl.
CPC ............ *G06T 13/20* (2013.01); *G06T 17/205* (2013.01); *G06T 2210/36* (2013.01)

(58) Field of Classification Search
CPC ... G06T 13/20; G06T 17/205; G06T 2210/36; G06T 13/00; G06T 17/20
See application file for complete search history.

(56) References Cited

U.S. PATENT DOCUMENTS 6,201,542 B1 * 3/2001 Arai .................. G06T 17/20
345/419
6,362,820 B1 * 3/2002 Hoppe .................. G06T 17/20
345/419

(Continued)

FOREIGN PATENT DOCUMENTS

JP    11-339061 A    12/1999
JP    2011-113135 A    6/2011

(Continued)

OTHER PUBLICATIONS

JP2011113135A (Machine Translation on Jun. 4, 2021) (Year: 2011).*

(Continued)

*Primary Examiner* — Michael Le
(74) *Attorney, Agent, or Firm* — Hauptman Ham, LLP

(57) ABSTRACT

In accordance with an aspect of the present disclosure, there is provided a method for simplifying three-dimensional mesh data using three-dimensional mesh data simplification device. The method comprises, determining a vertex or an edge of three-dimensional mesh data to be deleted based on animation information including skin weight values and geometric information of the three-dimensional mesh data; and simplifying the three-dimensional mesh data by deleting the vertex or the edge.

9 Claims, 2 Drawing Sheets

(56) References Cited

U.S. PATENT DOCUMENTS

| | | | |
|---|---|---|---|
| 2002/0075263 A1* | 6/2002 | Kato | G06T 17/20 |
| | | | 345/423 |
| 2003/0206165 A1* | 11/2003 | Hoppe | G06T 17/20 |
| | | | 345/420 |
| 2008/0062171 A1 | 3/2008 | Kim | |
| 2009/0174711 A1 | 7/2009 | Lee et al. | |
| 2010/0289823 A1 | 11/2010 | Ahn et al. | |
| 2016/0163103 A1* | 6/2016 | DeTemmerman | G06T 17/205 |
| | | | 345/419 |
| 2017/0018111 A1* | 1/2017 | Collet Romea | G09G 5/391 |
| 2017/0358133 A1* | 12/2017 | Iverson | G06T 17/205 |
| 2018/0089890 A1* | 3/2018 | Shreiner | G06T 17/20 |

FOREIGN PATENT DOCUMENTS

| | | | |
|---|---|---|---|
| JP | 2011113135 A | * | 6/2011 |
| KR | 10-2006-0090154 A | | 8/2006 |
| KR | 10-0810294 B1 | | 3/2008 |
| KR | 10-2009-0074874 A | | 7/2009 |
| KR | 10-1592294 B1 | | 2/2016 |

OTHER PUBLICATIONS

International Search Report dated Feb. 7, 2019, in connection with corresponding International Patent Application No. PCT/KR2018/013122, citing the above references.

* cited by examiner

METHOD AND DEVICE FOR SIMPLIFYING THREE-DIMENSIONAL MESH DATA

CROSS-REFERENCE TO RELATED APPLICATION

This present application is a national stage filing under 35 U.S.C § 371 of PCT application number PCT/KR2018/013122 filed on Oct. 31, 2018 which is based upon and claims the benefit of priority to Korean Patent Application No. 10-2017-0143516 filed on Oct. 31, 2016 in the Korean Intellectual Property Office. The disclosures of the above-listed applications are hereby incorporated by reference herein in their entireties.

TECHNICAL FIELD

The present disclosure relates to a method of simplifying three-dimensional mesh data and a device therefor, and, more particularly, to the method of simplifying the three-dimensional mesh data by decreasing the number of vertices or edges of the three-dimensional mesh data and the device therefor.

BACKGROUND

As is generally known, mesh simplification decreases the number of polygons with maintaining shapes and characteristics of an original three-dimensional model. In other words, the mesh simplification is a process for remodeling the original three-dimensional model into a simple model by deleting polygons having excessive geometric information. A technology for simplifying the three-dimensional model may be utilized in many technical fields such as computer animations, LOD (Level of Detail) controlling technologies for three-dimensional games, three-dimensional graphic solutions of the Internet, real-time simulation of three-dimensional graphics, and so on.

A purpose of the mesh simplification for three-dimensional mesh data is that geometric characteristics of the original three-dimensional model are maintained with lesser vertices and faces even after approximating the three-dimensional mesh data, and in order to achieve the purpose, priority values for the mesh simplification is utilized, the priority values for each edge of the three-dimensional mesh data are determined, and edges are deleted in an order of the priority values to simplify the three-dimensional mesh data.

Heretofore, priority values for the each edge of the three-dimensional mesh data are determined by considering geometric information such as the geometric characteristics, and the three-dimensional mesh data is simplified by deleting edges in the order of the determined priority values.

However, although the geometric characteristics of the three-dimensional model are somewhat maintained, there was a problem that animation qualities of the three-dimensional model get lowered because of considering only the geometric information to determine the priority values.

SUMMARY

According to one embodiment of the present disclosure, by determining an object to be deleted for mesh simplification reflecting geometric information and animation information of an original three-dimensional model, after the mesh simplification, geometric characteristics of the original three-dimensional model may be well maintained and deterioration of animation qualities may be minimized.

In accordance with an aspect of the present disclosure, there is provided a method for simplifying three-dimensional mesh data using three-dimensional mesh data simplification device. The method comprises, determining a vertex or an edge of three-dimensional mesh data to be deleted based on animation information including skin weight values and geometric information of the three-dimensional mesh data; and simplifying the three-dimensional mesh data by deleting the vertex or the edge.

In accordance with another aspect of the present disclosure, there is provided a three-dimensional mesh data simplification device. The three-dimensional mesh data simplification device comprises a control unit configured to simplify three-dimensional mesh data; and an output unit configured to output data corresponding to simplified model of the three-dimensional mesh data, and wherein the control unit is further configured to: determine a vertex or an edge of the three-dimensional mesh data to be deleted based on animation information including skin weight values and geometric information of the three-dimensional mesh data, and simplify the three-dimensional mesh data by deleting the vertex or the edge.

According to one embodiment of the present disclosure, the object to be deleted for the mesh simplification is determined by reflecting the geometric information and the animation information of the original three-dimensional model. Thus, there are effects that, after the mesh simplification, the geometric characteristics of the original three-dimensional model may be well maintained and the deterioration of the animation qualities may be minimized.

DETAILED DESCRIPTION

Figure 1:
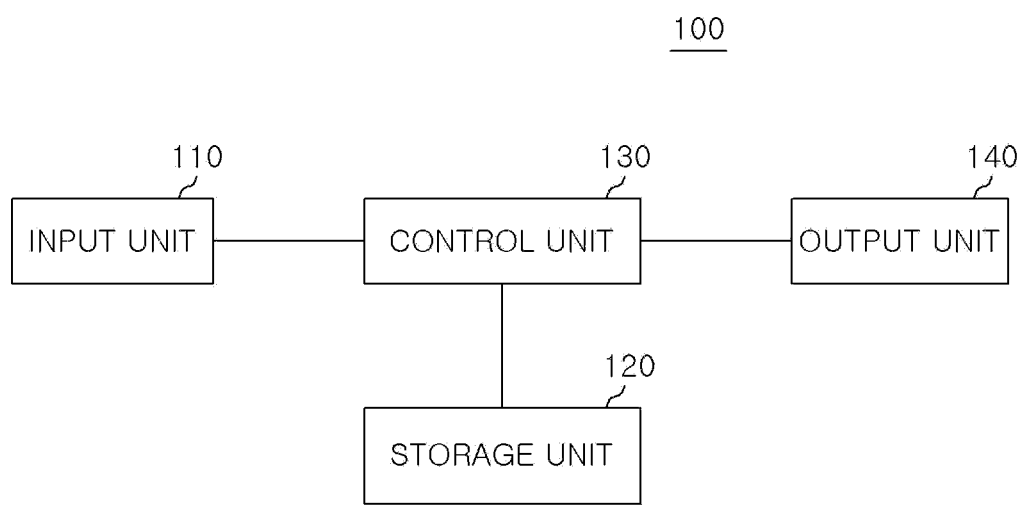
FIG. 1 shows a block diagram of a three-dimensional mesh data simplification device according to one embodiment of the present disclosure.

FIG. 1 shows a block diagram of a three-dimensional mesh data simplification device according to one embodiment of the present disclosure.

As illustrated in FIG. 1, the three-dimensional mesh data simplification device 100 according to the one embodiment includes an input unit 110, a storage unit 120, a control unit 130, and an output unit 140.

The input unit 110 is an input interface receiving three-dimensional mesh data that is a subject for mesh simplification, animation information, and simplification standard information for the mesh simplification and provides various input signals for the control unit 130. The input unit 110 may include keys for receiving numbers or letters and function keys for receiving a request for setting various functions. Further, the input unit 110 may include a communication means receiving various information through a communication network. For example, the input unit 110 may include an input interface of a computing device such as a keyboard and a mouse, a soft type input interface of a smartphone such as a touchscreen, and so on.

Computer executable instructions, when executed by the control unit 130, causing the control unit 130 to perform various processes are stored in the storage unit 120. Further, the three-dimensional mesh data that is the subject for the mesh simplification, corresponding animation information, the simplification standard information that is pre-input in a middle of manufacturing the three-dimensional mesh data simplification device 100 or is input through the input unit 110 after the manufacturing, etc. may be stored in the storage unit 120. Furthermore, as results of various processes, geometric characteristic values for the three-dimensional mesh data, priority values, data of simplified three-dimensional model may be stored in the storage unit 120. For example, the storage unit 120 may include a computer-readable storage medium that is at least one type of a flash memory type, a hard disk type, a MMC (Multi-Media Card micro type, a card type, a RAM (Random Access Memory), and a ROM (Read Only Memory.)

The control unit 130 may perform the various processes by executing the computer executable instructions stored in the storage unit 120. If the simplification standard information is provided through the input unit 110, the control unit 130 stores, according to a mesh simplification process, the simplification standard information in the storage unit 120 or an internal memory and sets up a simplification standard.

Further, the control unit 130 acquires geometric information and animation information, for the three-dimensional mesh data, corresponding to the simplification standard information. Herein, the geometric information may include, for each vertex, a distance from a vertex to an adjacent vertex, a size of adjacent triangles, a curvature at the vertex, an angle between adjacent planes, and a distance from the vertex to the adjacent planes and the animation information may include, for each vertex, a skin weight value and the number of connected joints. The skin weight value indicates a value corresponding to connection intensity for each joint connected to the each vertex of the three-dimensional mesh data, and the number of connected joints indicates the number of joints connected to the each vertex.

Furthermore, the control unit 130 determines an object to be deleted among vertices and edges of the three-dimensional mesh data by reflecting the acquired geometric information and/or the acquired animation information. Herein, the control unit 130 determines priority values, for the mesh simplification, for the vertices and the edges of the three-dimensional mesh data and determines the object to be deleted among the vertices and the edges based on the determined priority values. Herein, before determining the priority values for the mesh simplification, the control unit 130 may normalize, for the each vertex of the three-dimensional mesh data, a sum of the skin weight values for the each joint connected to the each vertex to one.

Furthermore, the control unit 130 may assign vertex priority values, for the mesh simplification, to the each vertex of the three-dimensional mesh data by reflecting the geometric information of the three-dimensional mesh data and the animation information of the three-dimensional mesh data. Next, the control unit 130 may determine edge priority values, for edge simplification, for each edge of the three-dimensional mesh data according to a sum of the vertex priority values assigned to both vertices of the each edge. Herein, the control unit 130 may determine that the vertex priority value is higher as the skin weight value is larger, and the vertex priority value is lower as the number of the connected joints is smaller.

Further, the control unit 130 simplifies the three-dimensional mesh data by deleting vertices or edges of the three-dimensional mesh data in an order of the determined priority values and outputs data of simplified three-dimensional model through the output unit 140. For example, the control unit 130 may include a processor such as CPU (Central Processing Unit) and so on.

The output unit 140 outputs three-dimensional mesh data corresponding to three-dimensional model simplified from original three-dimensional mesh data. The output unit 140 may include a display means displaying the simplified three-dimensional mesh data as visual information or a communication means transmitting the three-dimensional mesh data through the communication network. For example, the output unit 140 may include a flat panel display component such as LCD (Liquid Crystal Display) and so on.

Figure 2:
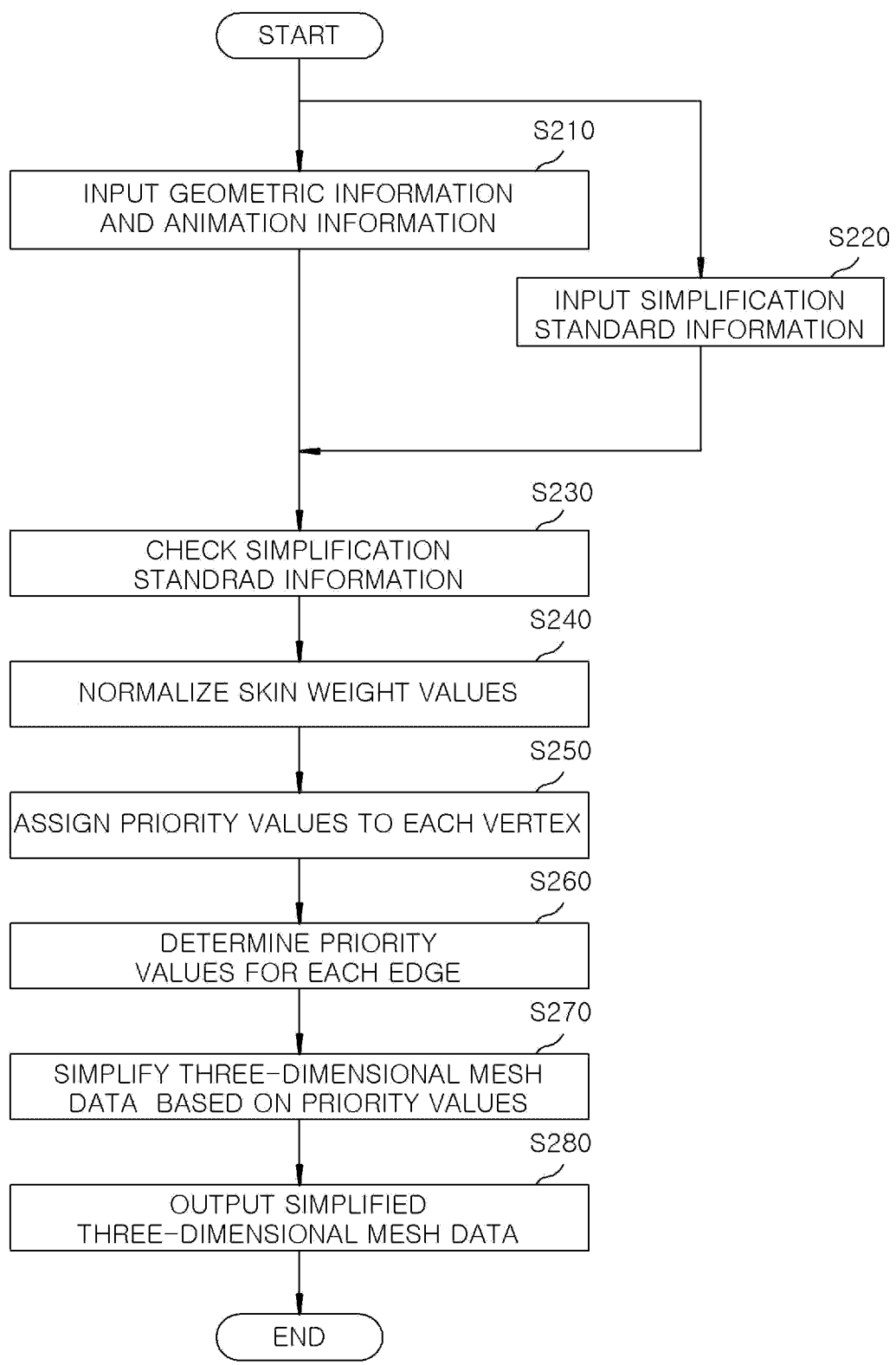
FIG. 2 shows a flowchart illustrating a three-dimensional mesh data simplifying method performed by a three-dimensional mesh data simplification device according to one embodiment of the present disclosure.

FIG. 2 shows a flowchart illustrating a three-dimensional mesh data simplifying method performed by a three-dimensional mesh data simplification device according to one embodiment of the present disclosure.

In a step S210, geometric information of the three-dimensional mesh data that is a subject of mesh simplification and corresponding animation information can be input into the three-dimensional mesh data simplification device 100. Further, in a step S220, simplification standard information for the mesh simplification may be input into the three-dimensional mesh data simplification device 100. Furthermore, the input geometric information of the three-dimensional mesh data, the input animation information of the three-dimensional mesh data, and the simplification standard information may be stored in an internal memory of the control unit 130 or the storage unit 120. Herein, the simplification standard information is stored and set up to determine how to perform a mesh simplification process for the three-dimensional mesh data.

In a step S230, the three-dimensional mesh data simplification device 100 checks the simplification standard information input in the step S220. Further, the three-dimensional mesh data simplification device 100 acquires the geometric information of the three-dimensional mesh data previously input in the step S210 if the simplification standard information includes geometric information. Furthermore, the three-dimensional mesh data simplification device 100 acquires the animation information previously input in the step S210 if the simplification standard information includes animation information. Herein, the geometric information may include, for each vertex, a distance from a vertex to an adjacent vertex, area size of adjacent triangles, a curvature at the vertex, an angle between adjacent planes, and a distance from the vertex to the adjacent planes and the animation information may include, for each vertex, a skin weight value and the number of connection joints.

In a step S240, the three-dimensional mesh data simplification device 100 may normalize, for the each vertex of the three-dimensional mesh data, a sum of the skin weight values for each joint connected to the each vertex to one.

In a step S250, the three-dimensional mesh data simplification device 100 may assign vertex priority values, for the mesh simplification, to the each vertex of the three-dimensional mesh data by reflecting the geometric information of the three-dimensional mesh data and the animation information of the three-dimensional mesh data that are input in the step S210.

In a step S260, the three-dimensional mesh data simplification device 100 may determine edge priority values, for edge simplification, for each edge of the three-dimensional mesh data according to a sum of the vertex priority values, assigned to the each vertex in the step S250, for both vertices of the each edge. Herein, it may be determined that the vertex priority value is higher as the skin weight value is larger, and the vertex priority value is lower as the number of the connected joints is smaller.

In a step S270, the three-dimensional mesh data simplification device 100 determines an object to be deleted for the mesh simplification or the edge simplification based on the priority values. Further, the three-dimensional mesh data simplification device 100 simplifies the three-dimensional mesh data by deleting vertices or edges of the three-dimensional mesh data in an order of the priority values. Furthermore, in a step S280, the three-dimensional mesh data simplification device 100 outputs three-dimensional mesh data corresponding to the simplified three-dimensional mesh data. For example, the three-dimensional mesh data simplification device 100 may output the simplified three-dimensional mesh data as an executable form by a computing device or display the simplified three-dimensional mesh data as visual information.

Hereinafter, referring to FIG. 1 and FIG. 2, the three-dimensional mesh data simplifying method performed by the three-dimensional mesh data simplification device 100 according to one embodiment of the present disclosure is described in detail.

To begin with, through the input unit 110 of the three-dimensional mesh data simplification device 100, a user inputs geometric information of three-dimensional mesh data that is a subject for mesh simplification, corresponding animation information in the step S210, and simplification standard information for the mesh simplification in the step S220.

Herein, the simplification standard information input in the step S220 may include a function such as a following equation (1) to be utilized when assigning vertex priority values to each vertex in the step S250. Further, the geometric information of the three-dimensional mesh data input in the step S210 may include, for the each vertex, a distance from a vertex to an adjacent vertex, a size of adjacent triangles, a curvature at the vertex, an angle between adjacent planes, and a distance from the vertex to the adjacent planes which are included in the following equation (1) and the animation information may include, for the each vertex, a skin weight value and the number of connection joints which are included in the following equation (1)

$$\begin{aligned}\text{priority value} = \quad & \quad (1)\\
& a \times (\text{the distance from the vertex to the adjacent vertex}) + \\
& b \times (\text{the size of adjacent triangles}) + c \times (\text{curvature at the vertex}) + \\
& d \times (\text{the angle between adjacent planes}) + \\
& f \times \left( \frac{1.0}{\text{skin weight value of the vertex}} \right) + \\
& g \times (\text{the number of connection joints})
\end{aligned}$$

A rate for reflecting the geometric information and the animation information may be adjusted as changing values of the coefficients a, b, c, d, e f, and g which are included in the equation (1) when assigning the vertex priority values to the each vertex in the step S250.

The control unit 130 of the three-dimensional mesh data simplification device 100 may store the input geometric information of the three-dimensional mesh data, the input animation information of the three-dimensional mesh data, and the input simplification standard information in an internal memory or the storage unit 120. Herein, storing the input simplification standard information by the control unit 130 may indicate setting up a standard for the mesh simplification.

Next, in the step S230, the control unit 130 checks the simplification standard information that is input and set up as previously described and acquires the geometric information and the animation information of the three-dimensional mesh data according to the checked simplification standard information.

Herein, the control unit 130 retrieves the geometric information stored in the storage unit 120 if the simplification standard information input in the step S220 includes geometric information. For example, if the simplification standard information input in the step S220 includes, as the geometric information, all of the distance from the vertex to the adjacent vertex, the size of the adjacent triangles, the curvature at the vertex, the angle between the adjacent planes, and the distance from the vertex to the adjacent planes, that is to say if each of coefficient a through e included in the equation (1) is not zero, the control unit 130 retrieves every components in the geometric information stored in the storage unit 120.

Further, the control unit 130 retrieves the animation information stored in the storage unit 120 if the simplification standard information input in the step S220 includes animation information. For example, if the simplification standard information input in the step S220 includes, as the animation information, all of the skin weight values and the number of the connection joints, that is to say if the coefficients f and g included in the equation (1) are not zero, the control unit 130 retrieves every components in the animation information stored in the storage unit 120.

Next, in the step S240, the control unit 130 normalizes, for the each vertex of the three-dimensional mesh data, a sum of the skin weight values for each joint connected to the each vertex to one. The normalizing for the skin weight values may be performed only if the simplification standard information input in the step S220 includes, as the animation information, the skin weight values, that is to say if the coefficient f included in the equation (1) is not zero.

Further, the control unit 130 determines an object to be deleted for the mesh simplification among vertices and edges of the three-dimensional mesh data by reflecting the geometric information and the animation information of the three-dimensional mesh data input in the step S210. Herein, the control unit 130 assigns the priority values to the each vertex or each edge of the three-dimensional mesh data to utilize the assigned priority values as a simplification standard information for determining the object to be deleted. In other words, in the step S250, the control unit 130 assigns the vertex priority values, for the mesh simplification, to the each vertex of the three-dimensional mesh data. Herein, the control unit 130 may calculate the priority values for the each vertex of the three-dimensional mesh data by utilizing the equation (1) and assign each of the calculated priority values to the each vertex.

Next, in the step S260, the control unit 130 may determine edge priority values, for edge simplification, for the each edge of the three-dimensional mesh data according to a sum of the vertex priority values, assigned to the each vertex in the step S250, for both vertices of the each edge. Herein, the control unit 130 may determine that the vertex priority value is higher as the skin weight value is larger, and the vertex priority value is lower as the number of the connection joints is smaller by using the equation (1). If the mesh simplification for the three-dimensional mesh data is performed based on the vertex priority values for the each vertex in the step S270, the control unit 130 does not perform to determine the edge priority values for the each edge in the step S260.

Next, in the step S270, the control unit 130 may determine a vertex to be deleted for the mesh simplification among the vertices of the three-dimensional mesh data based on the vertex priority values for the each vertex assigned in the step S250 or determine an edge to be deleted for the edge simplification among the edges of the three-dimensional mesh data based on the edge priority values for the each edge determined in the step S260. Further, the control unit 130 may simplify the three-dimensional mesh data by deleting vertices determined to be deleted in an order of the vertex priority values for the each vertex assigned in the step S250 or by deleting edges determined to be deleted in an order of the edge priority values for the each edge determined in the step S260. For example, in the case of performing the mesh simplification in the order of the vertex priority values for the each vertex, if one vertex among a standard vertex and adjacent vertices to the standard vertex is deleted, corresponding edge is deleted among edges connecting the standard vertex and adjacent vertices and the three-dimensional mesh data may be hereby simplified. For example, the standard vertex may be deleted first among the standard vertex and the adjacent vertices. Otherwise, in the case of performing the mesh simplification in the order of the edge priority values, the three-dimensional mesh data may be simplified by deleting an edge of the highest edge priority value and combining two vertices of the deleted edge.

Next, in the step S280, the output unit 140 outputs three-dimensional mesh data corresponding to a simplified three-dimensional model following a control by the control unit 130. For example, the output unit 140 may output the simplified three-dimensional mesh data as an executable form by a computing device or may display the simplified three-dimensional mesh data as visual information.

As previously described, according to the one embodiment of the present disclosure, an object to be deleted for the mesh simplification is determined by reflecting the geometric information and the animation information of the three-dimensional mesh data. Thus, a result of the mesh simplification may well maintain geometric characteristics of an original model of the three-dimensional mesh data and minimize deterioration of animation qualities. An animation of the three-dimensional mesh data mainly occurs around a joint, but the animation occurs relatively less in a middle of a flat bone rather than around the joint. Further, a vertex around the joint of the three-dimensional mesh data has a smaller skin weight value and a vertex in the middle of the flat bone rather than around the joint has a relatively larger skin weight value. Thus, in the step S250, if it is determined that the vertex priority value is higher as the skin weight value is larger, and the vertex priority value is lower as the number of the connected joints is smaller, the mesh simplification for the three-dimensional mesh data may be performed maintaining the animation qualities because the larger skin weight value or the smaller number of the connection joints a vertex has, the earlier the vertex or corresponding edge is deleted in the step S270.

INDUSTRIAL APPLICABILITY

According to one embodiment of the present disclosure, an object to be deleted for mesh simplification is determined by reflecting geometric information and animation information of an original three-dimensional model. Thus, a result of the mesh simplification may well maintain geometric characteristics for the original three-dimensional model and minimize deterioration of animation qualities.

A technology for simplifying the three-dimensional model may be utilized in technical fields such as computer animations, LOD (Level of Detail) controlling technologies for three-dimensional games, three-dimensional graphic solutions of the Internet, real-time simulation of three-dimensional graphics, and so on.

What is claimed is:

1. A method for simplifying three-dimensional mesh data using three-dimensional mesh data simplification device comprising:
assigning a priority value, for each vertex of the three-dimensional mesh data for the mesh simplification, to the each vertex based on animation information including a skin weight values and geometric information of the three-dimensional mesh data;
determining, for each edge of the three-dimensional mesh data for the mesh simplification, a priority value for the each edge according to a sum of priority values for the each vertex assigned to vertices at both ends of the each edge;
determining the vertex or the edge of the three-dimensional mesh data to be deleted based on the determined priority value; and
simplifying the three-dimensional mesh data by deleting the vertex in an order of the priority value for the each vertex or deleting the edge in an order of the priority value for the each edge.

2. The method of claim 1, the animation information further includes the number of joints connected to each vertex.

3. The method of claim 2, wherein the priority value for the vertex is determined to be higher as the skin weight value is larger, and to be lower as the number of the connected joints is smaller.

4. The method of claim 1, further comprising:
normalizing, for each vertex of the three-dimensional mesh data, a sum of the skin weight values for each joint connected to the each vertex to 1 before the determining of the priority value.

5. A non-transitory computer-readable storage medium including computer executable instructions, wherein the instructions, when executed by a processor, cause the processor to perform a method for simplifying three-dimensional mesh data using three-dimensional mesh data simplification device comprising:
assigning a priority value, for each vertex of the three-dimensional mesh data for the mesh simplification, to the each vertex based on animation information including a skin weight values and geometric information of the three-dimensional mesh data;
determining, for each edge of the three-dimensional mesh data for the mesh simplification, a priority value for the each edge according to a sum of priority values for the each vertex assigned to vertices at both ends of the each edge;
determining the vertex or the edge of the three-dimensional mesh data to be deleted based on the determined priority value; and
simplifying the three-dimensional mesh data by deleting the vertex in an order of the priority value for the each vertex or deleting the edge in an order of the priority value for the each edge.

6. A three-dimensional mesh data simplification device comprising:
a control unit configured to simplify three-dimensional mesh data; and an output unit configured to output data corresponding to simplified model of the three-dimensional mesh data, and wherein the control unit is further configured to:
- assign a priority value, for each vertex of the three-dimensional mesh data for the mesh simplification, to the each vertex based on animation information including a skin weight values and geometric information of the three-dimensional mesh data;
- determine, for each edge of the three-dimensional mesh data for the mesh simplification, a priority value for the each edge according to a sum of priority values for the each vertex assigned to vertices at both ends of the each edge;
- determine the vertex or the edge of the three-dimensional mesh data to be deleted based on the determined priority value, and
- simplify the three-dimensional mesh data by deleting the vertex in an order of the priority value for the each vertex or deleting the edge in an order of the priority value for the each edge.

7. The three-dimensional mesh data simplification device of claim 6, wherein the animation information further includes the number of joints connected to each vertex.

8. The three-dimensional mesh data simplification device of claim 7, wherein the control unit is further configured to determine that the priority value for the vertex is higher as the skin weight value is larger, and the priority value for the vertex is lower as the number of the connected joints is smaller.

9. The three-dimensional mesh data simplification device of claim 6, wherein, before determining the priority value, the control unit is further configured to normalize, for each vertex of the three-dimensional mesh data, a sum of the skin weight values for each joint connected to the each vertex to 1.

* * * * *